(No Model.) 10 Sheets—Sheet 1.
L. EHRLICH.
CASH REGISTER AND INDICATOR.

No. 520,672. Patented May 29, 1894.

Witnesses.
S. M. Brainard
V. W. Hopr

Inventor.
Leo Ehrlich
by Edward Rector
his Atty.

THE NATIONAL LITHOGRAPHING COMPANY,
WASHINGTON, D. C.

(No Model.) 10 Sheets—Sheet 4.

L. EHRLICH.
CASH REGISTER AND INDICATOR.

No. 520,672. Patented May 29, 1894.

(No Model.) 10 Sheets—Sheet 5.

L. EHRLICH.
CASH REGISTER AND INDICATOR.

No. 520,672. Patented May 29, 1894.

(No Model.) 10 Sheets—Sheet 6.

L. EHRLICH.
CASH REGISTER AND INDICATOR.

No. 520,672. Patented May 29, 1894.

(No Model.) 10 Sheets—Sheet 7.

L. EHRLICH.
CASH REGISTER AND INDICATOR.

No. 520,672. Patented May 29, 1894.

Witnesses.
Inventor.

(No Model.) 10 Sheets—Sheet 8.
L. EHRLICH.
CASH REGISTER AND INDICATOR.

No. 520,672. Patented May 29, 1894.

Witnesses. Inventor.

(No Model.) 10 Sheets—Sheet 9.
L. EHRLICH.
CASH REGISTER AND INDICATOR.

No. 520,672. Patented May 29, 1894.

Witnesses.

Inventor.

(No Model.) 10 Sheets—Sheet 10.

L. EHRLICH.
CASH REGISTER AND INDICATOR.

No. 520,672. Patented May 29, 1894.

Witnesses.

Inventor.

UNITED STATES PATENT OFFICE.

LEO EHRLICH, OF ST. LOUIS, MISSOURI, ASSIGNOR TO THE NATIONAL CASH REGISTER COMPANY, OF DAYTON, OHIO.

CASH REGISTER AND INDICATOR.

SPECIFICATION forming part of Letters Patent No. 520,672, dated May 29, 1894.

Application filed December 29, 1893. Serial No. 495,102. (No model.)

*To all whom it may concern:*

Be it known that I, LEO EHRLICH, a citizen of the United States, residing at St. Louis, in the State of Missouri, have invented a certain new and useful Improvement in Cash Registers and Indicators, of which the following is a description, reference being had to the accompanying drawings, forming part of this specification.

My improved machine embodies a registering and an indicating mechanism, which are actuated by a reciprocating key-frame which carries the series of keys or stops representing different values. When an amount is to be indicated and registered the key representing such amount is pressed in or set and the reciprocating frame then moved until such key contacts with a fixed stop and the frame is thereby arrested after having moved just far enough to indicate and register the proper amount.

The novelty of the invention will be hereinafter set forth and particularly pointed out in the claims.

Figure 1:
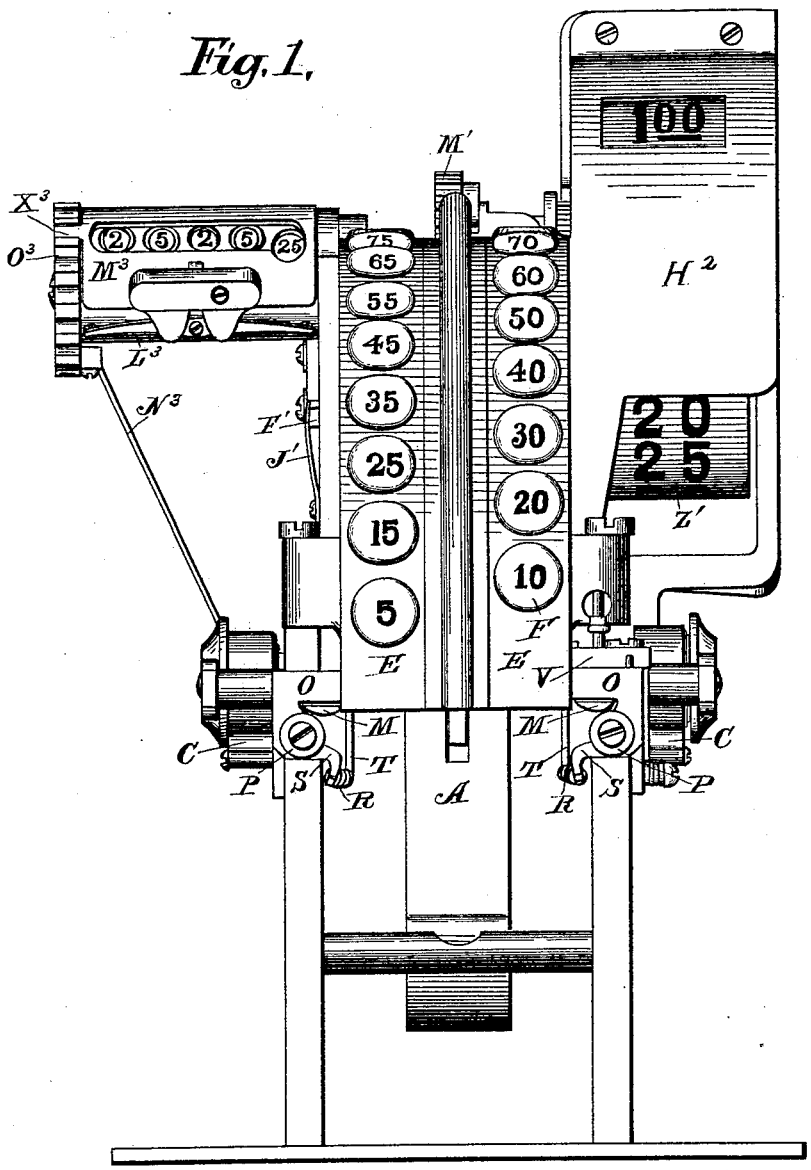
Figure 2:
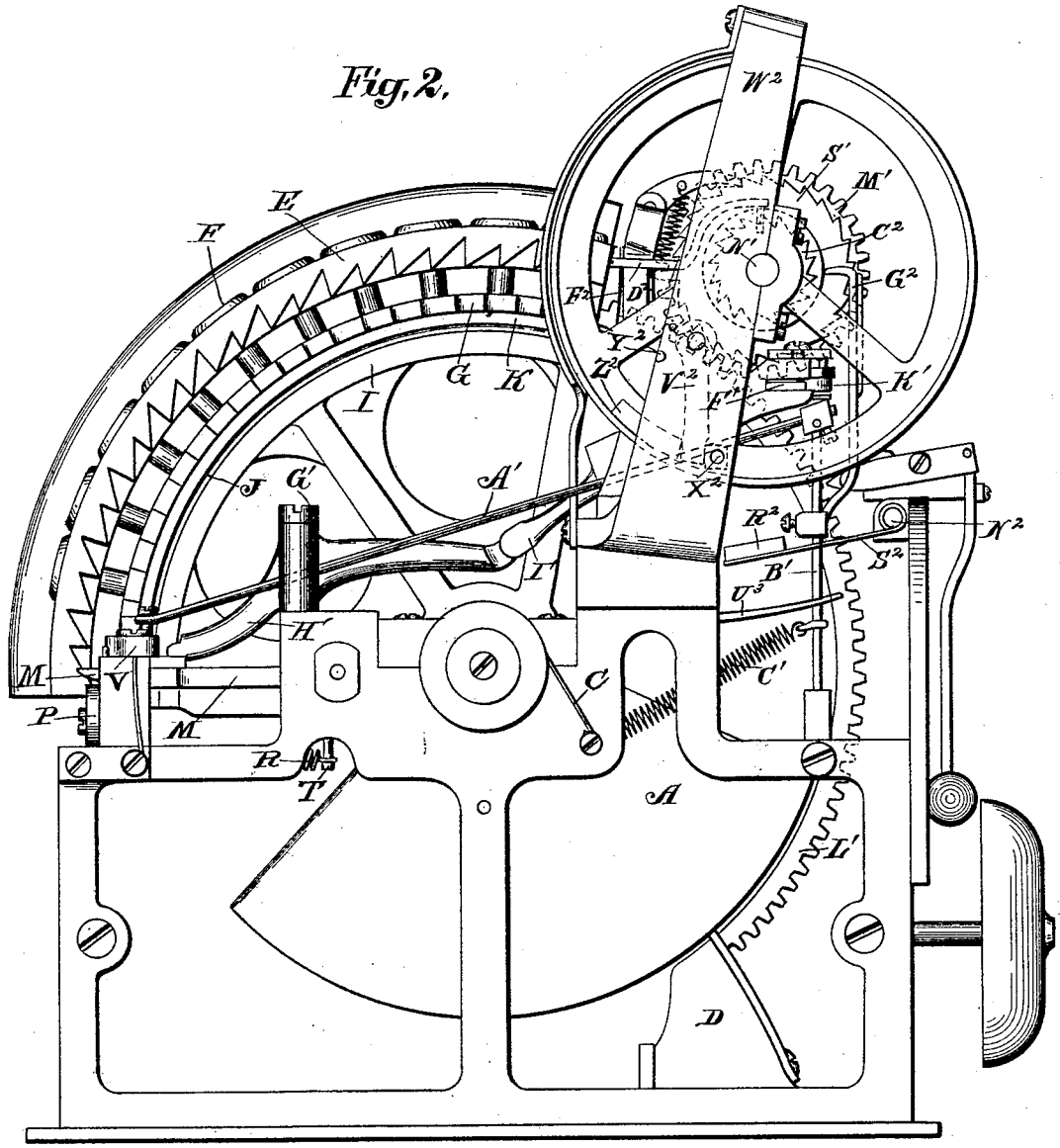
Figure 3:
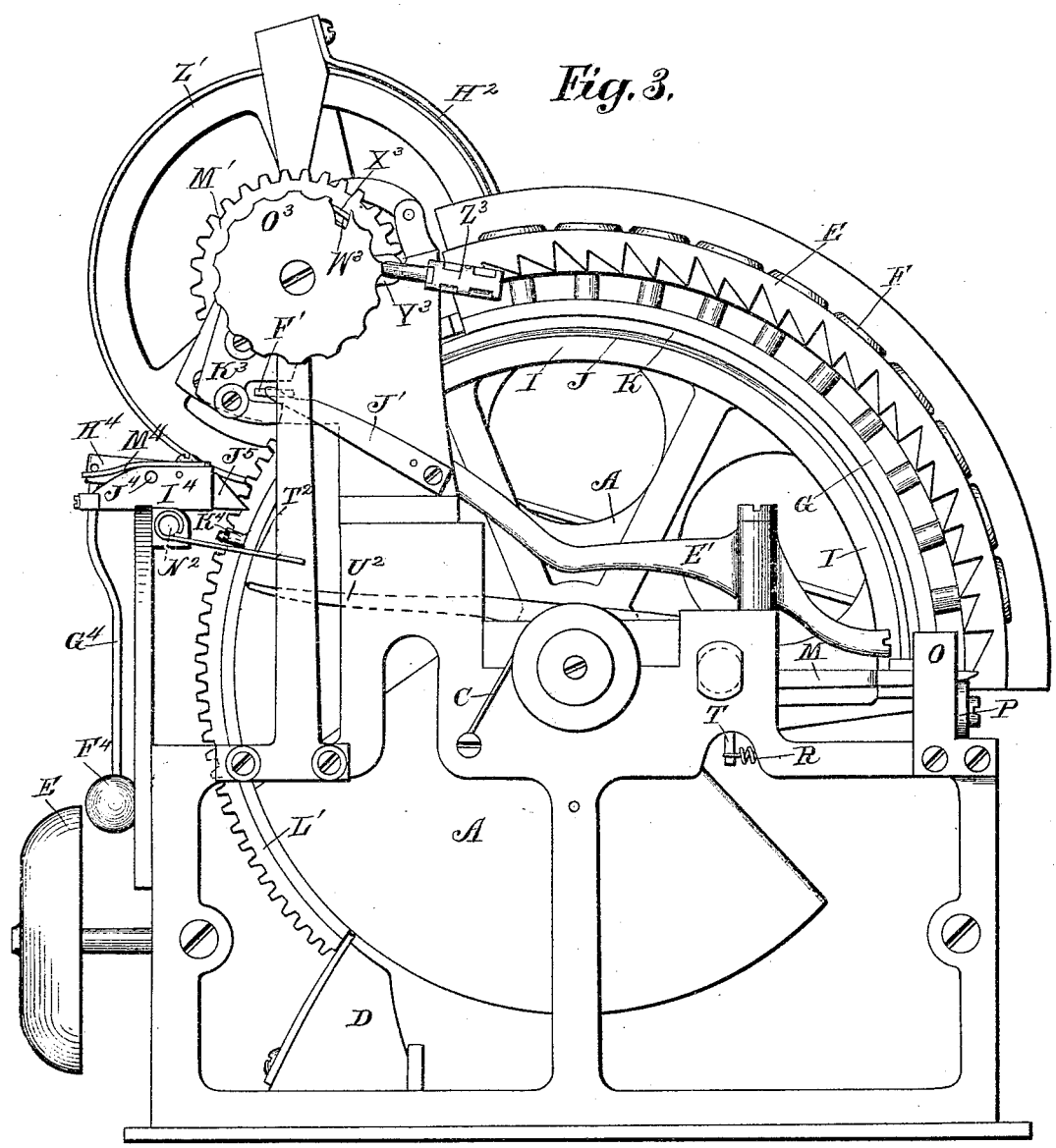
Figure 4:
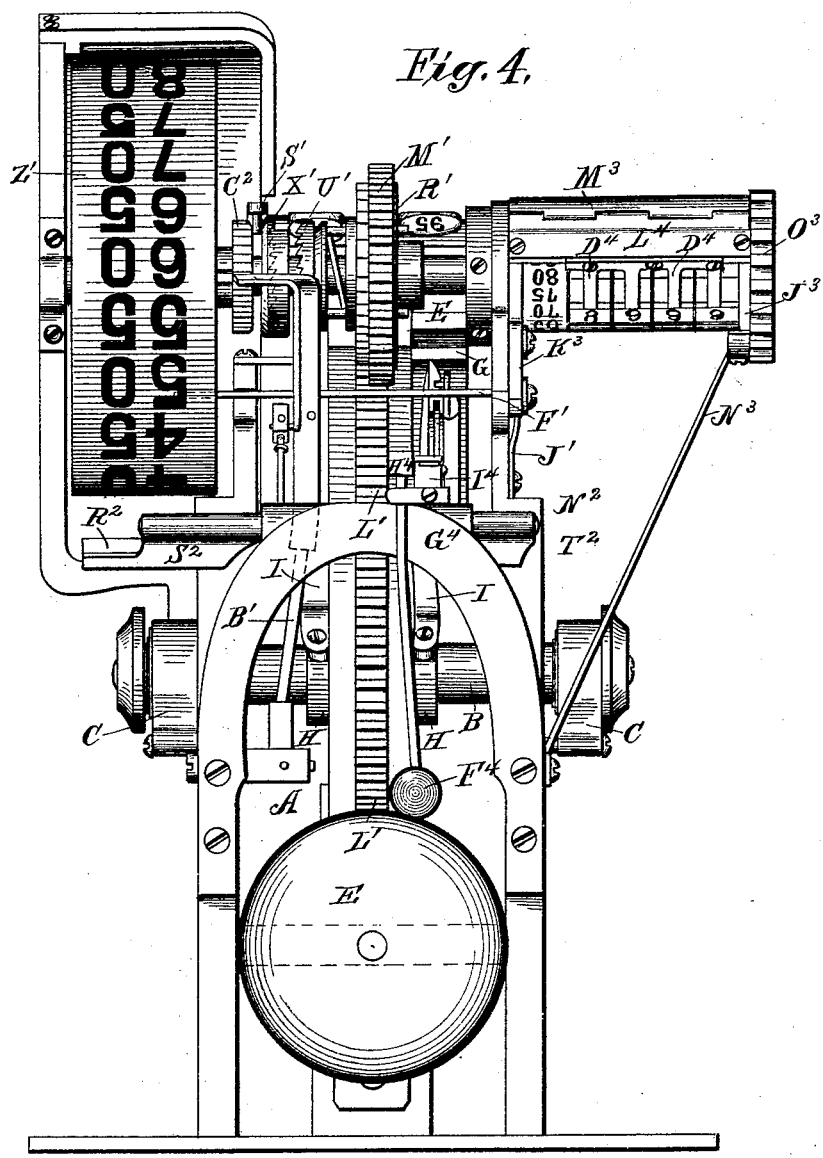
Figure 5:
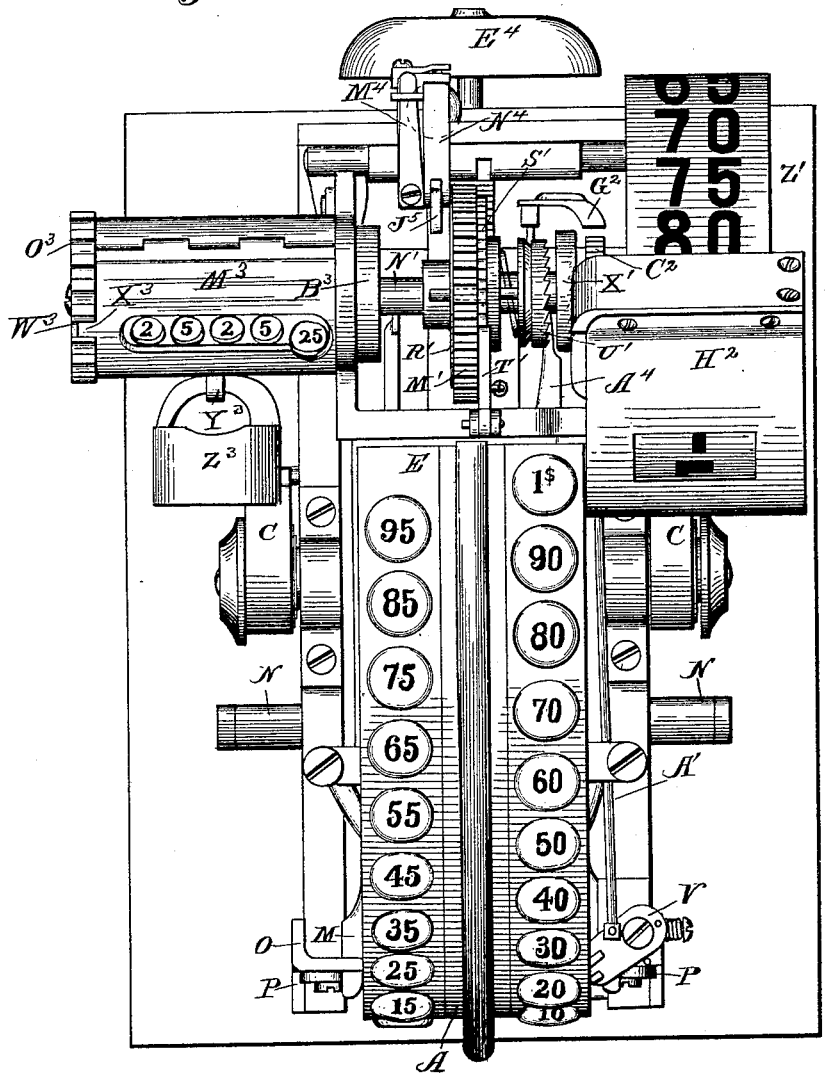
Figure 6:
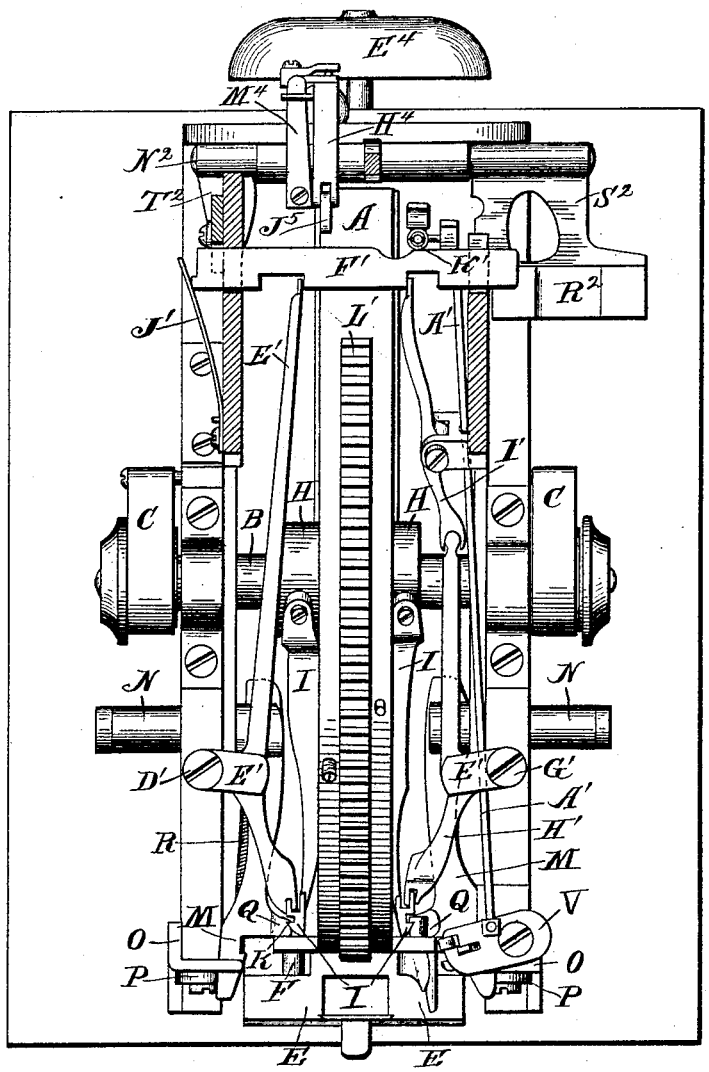
Figure 7:
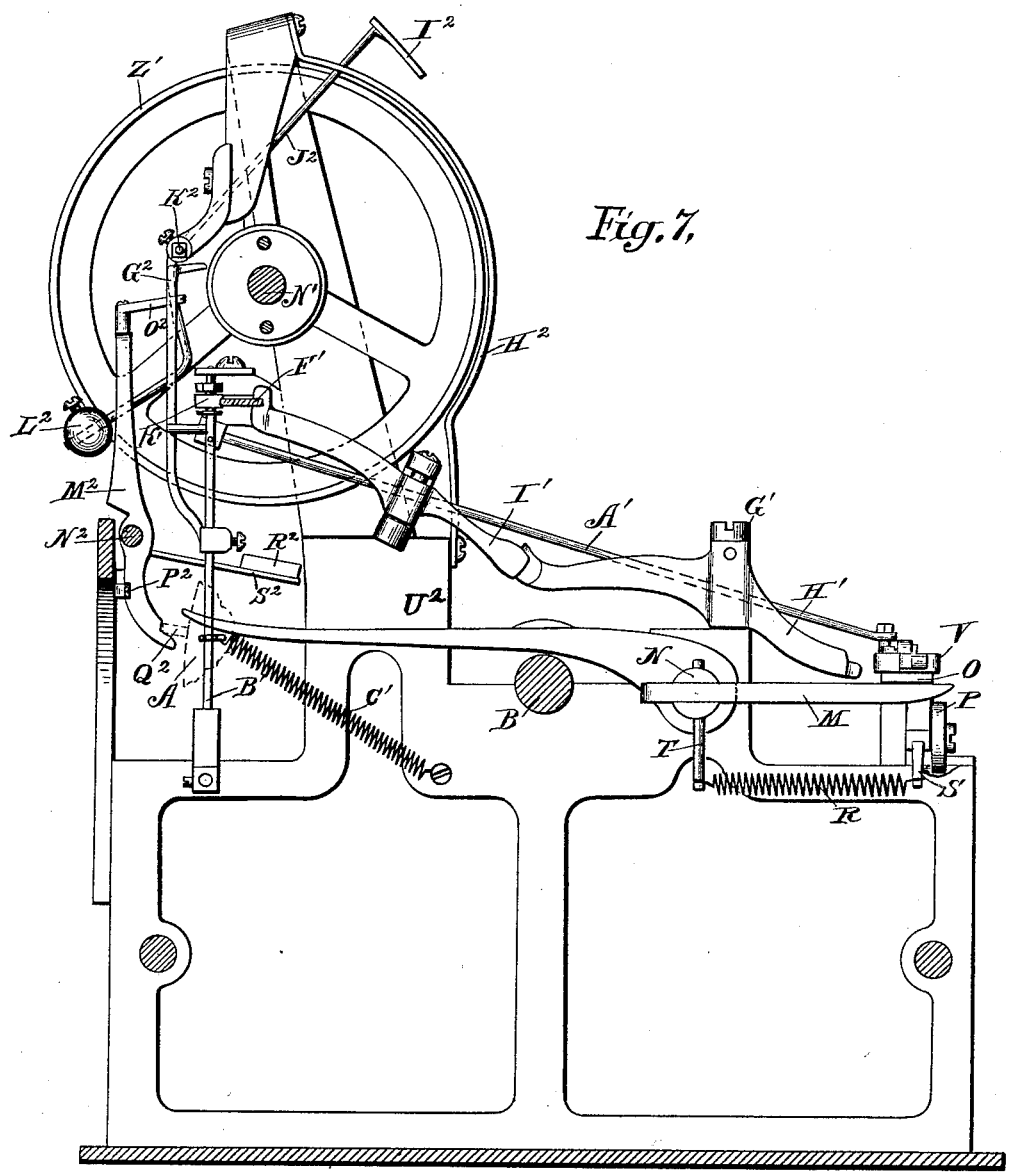
Figure 8:
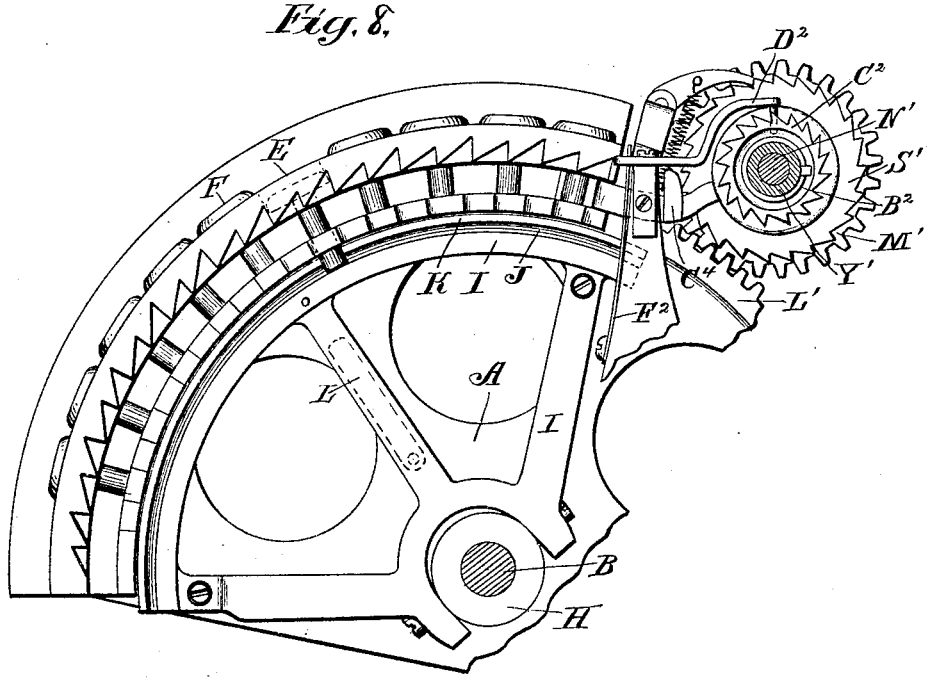
Figure 9:
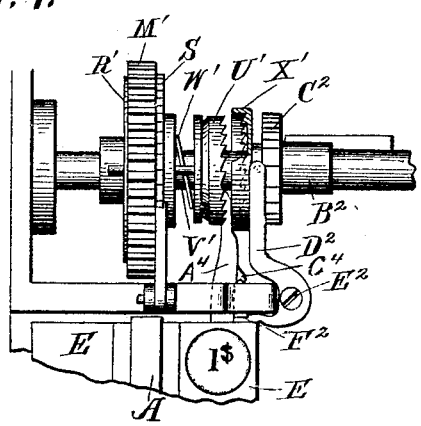
Figure 14:
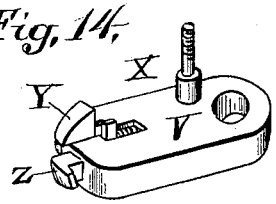
Figure 15:
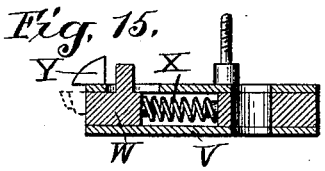
Figure 16:

In the accompanying drawings Figure 1 represents a front elevation of the machine; Fig. 2 an elevation of the right side of the machine; Fig. 3 a corresponding view of the left side of it; Fig. 4 a rear elevation; Fig. 5 a top plan view; Fig. 6 a top plan view with the segmental key frame pulled forward and downward to its limit of movement and with the indicating and registering wheels removed and their supporting brackets or frames shown in section; Fig. 7 a vertical section in a plane immediately at the right of the segmental frame, looking toward the right of the machine; Fig. 8 a detail side elevation of a part of the segmental frame and co-operating devices; Fig. 9 a front elevation of the clutch device shown in Fig. 8; Figs. 10, 11, 12 and 13 detail views of the indicating mechanism; Figs. 14, 15 and 16 detail views of the pawl-carrier and pawl; and Figs. 17, 18, 19, 20 and 21 detail views of parts of the registering devices.

The same letters of reference are used to indicate identical parts in all the figures.

The operating device of the machine consists of an oscillating frame A fast upon a central shaft B mounted in bearings on the opposite side frames of the machine. Springs C coiled around the opposite ends of the shaft B and secured at their inner ends to said shaft and at their outer ends to the side frames, yieldingly hold the oscillating frame A in normal position against a stop D upon the bottom plate of the frame, Figs. 2 and 3, and are put under tension when the frame A is pulled forward and downward. The oscillating frame A is segmental in form, occupying something more than half a circle. The upper and forward half of it constitutes the key-frame proper, and has secured upon its opposite sides two segmental key-holding plates E, each containing a series of stop-keys F capable of being slid inward and outward. The tubular outer ends of the keys fit snugly in circular holes in the plates E, while the inner lower ends of their stems are passed through guide apertures in two curved plates G also secured to the opposite sides of the frame A, beneath the plates E.

Pivoted to hubs upon collars H fast upon the opposite sides of the frame A or upon the shaft B, Figs. 4, 6 and 8, are two segmental detent-frames or plates I, one upon each side of and parallel with the frame A, and capable of slight rocking movement upon their pivotal supports toward and from the frame A. The outer edges of these plates I fit just within and beneath the inner key-plates G and normally stand in line with the two rows of keys, and the outer sides of their edges are beveled off so that when any one of the keys is pressed inward its inner end can push the plate aside, toward the frame A, and pass it, Figs. 6 and 8. The plates I are provided with grooves J parallel with and just within their beveled edges, thereby forming locking flanges K upon their edges, Fig. 6, which flanges are adapted to co-operate with notches in the stems of the keys F, when the latter are pressed inward, and hold them in their inner position until the plates I are rocked to release them. Curved sheet metal springs L (dotted lines Fig. 8) interposed between the plates I and the frame A press the former outward, away from the plates, and yieldingly hold them in line with the respective rows of keys, ready to catch and hold any key that may be pressed in. The frame A has secured to its outer periphery between the plates E E a grasping bead or plate by which the frame may be easily grasped for the purpose of pulling it forward and downward.

The operation of this much of the machine consists in pressing in the key which represents the amount it is desired to indicate and register, and then pulling the frame A forward and downward until the inner end of such key strikes a stop, hereinafter referred to, and arrests the movement of the frame. Beginning with the lowest key in the series the succeeding higher keys represent regularly increasing values, up to the highest key in the series, which represents the highest value. In the present instance the lowest key represents a value of five, the next higher ten, and so on to the highest one, which represents one hundred—in this instance one hundred cents or one dollar. It follows, therefore, that if any key be pressed in and the frame be pulled forward until it is arrested by the contact of such key with the stop the frame will be given a movement proportionate to the value of such key.

The stops heretofore referred to, for arresting the frame A, consist of horizontal arms M, Figs. 6 and 7, pivoted at their inner or rear ends in slots in the inner ends of short rock-shafts N journaled in bearings in the side-frames of the machine. The outer ends of the stop arms M are confined between bracket-plates O upon the framework and subjacent disks or rollers P mounted on the front side of the frame, and rest immediately adjacent the sides or edges of the key-plates E, Fig. 6. Each arm is provided upon its side next the frame A with a laterally projecting lug Q which stands in the path traveled by the inner end of the operated key when the frame A is pulled forward, so that when the key comes in contact with said lug the movement of the frame is arrested. In normal position the outer ends of the arms M rest somewhat to one side of the vertical line of the axes of the rollers P, so that when said arms are pressed down against said rollers the latter turn and permit the ends of the arms to move toward the middle line of the machine. The extreme inner ends of the lugs Q on the arms M bear against the outer sides of the detent-plates I before described, so that if the end of the arm M be pressed down forcibly and thereby forced toward the middle of the machine, in the manner just described, the lug Q will rock the detent-plate I toward the middle line of the machine and release any key that may have been pressed in and caught and held by it. In this manner the contact of the operated key with the lug Q of one of the arms M will cause the detent plate by which the key is held in inner position to be so moved as to release the key. For the purpose of preventing further downward movement of the frame after the key has struck the lug Q of the arm M and been released, and to insure the positive stopping of the frame before the key is released, the outer edges or sides of the key plates E have a series of locking teeth and notches formed in them, as seen in Figs. 2 and 3. When the outer ends of the arms M are thrown toward the middle line of the machine they enter the notches between the teeth on the plates E, so that the frame A is arrested both by the contact of the operated key with the lug Q of the arm M and by the engagement of the arm M with a notch in the plate E, and inasmuch as the arm enters the notch before the arm has moved far enough to disengage the detent plate I from the key and release the latter the positive stopping of the frame at the proper point is insured. The outer ends of the arms M are yieldingly held in their normal upper positions, and returned thereto after being depressed in the manner described, by springs R, Fig. 7, connected at their front ends to hooks S upon the framework and at their rear ends to pins T passed through the rock-shafts N.

For the purpose of insuring a full forward and downward movement of the segmental frame at each operation, and preventing its return to normal position until its operated key has come in contact with one of the stop-arms M and been released, there is provided the following mechanism: Pivoted upon the framework above the forward end of the right hand stop-arm M, Fig. 6, is a pawl-carrier V in the form of a casing or housing, Figs. 14 and 15, containing a double-toothed sliding pawl W, Fig. 16, pressed outward by a coiled spring X confined behind it. One tooth Y of the pawl has a beveled or rounded upper side and an abrupt lower side, and is adapted to co-operate with ratchet teeth formed upon the edge of the right hand one of the two inner key-plates G, Figs. 2 and 6. The second tooth Z of the pawl has a beveled lower side and a flat upper side and is adapted to co-operate with the notches in the outer key plate E. A rod A', Figs. 2, 6 and 7, connected at its front end to the pivoted pawl-carrier V, is connected at its rear end to a vertical rod or arm B' pivotally mounted upon the framework at its lower end, Figs. 2 and 7. A coiled spring C' connected to the rod B' pulls it forward against a suitable stop and holds the pawl-carrier in such position that the pawl-tooth Z is engaged with one of the notches in the plate E, while the tooth Y of the pawl occupies a middle position between the plate E and G and not in engagement with either. In this position of the plates the segmental key frame is locked from forward movement by the pawl-tooth Z, so that before it can be pulled forward and downward the pawl-carrier V must be swung rearward on its pivot and the tooth Z moved out of engagement with the notched plate E. By means of a connection with the detent-plates I this movement of the pawl-carrier is effected by the pressing in of any one of the keys at the beginning of an operation. As seen in Figs. 3 and 6, there is pivoted to the framework on a vertical pivot D', at the left hand side of the key frame, a lever E' whose notched front end engages a flange upon the inner edge of the left hand detent-plate I and whose rear end projects into a notch in a laterally sliding bar F' mounted in guide-ways in the framework. It results from this that whenever the detent plate I is thrown to the right by the pressing in of a key the rear end of the lever E' will be thrown to the left. Upon the opposite side of the key-frame there is pivoted at G', Figs. 2 and 7, a lever H' similar to but shorter than the lever E'. Its front end engages the right detent-plate I in the same manner that the lever E' engages the left hand one, and its rear end, instead of extending rearward to the sliding bar F', is jointed to the front end of a second lever I' whose rear end engages a recess in the bar F'. The purpose of the lever I' is simply to reverse the direction of motion of the lever H', so that when the detent plate I is moved to the left by pressing in a key the rear end of the lever I' will be thrown to the left, the same as the lever E'. In Fig. 6 a key in the right hand row is shown pressed in and the rear end of the lever I' is thrown to the left and has carried the bar F' with it against the pressure of a flat spring J', Figs. 3 and 6, secured to the left hand side of the frame and pressing against the end of the bar. If the operated key had been in the left hand row the lever E' would have moved the bar to the same position.

The upper end of the vertical rod B' carries an anti-friction roller K', Figs. 2, 6 and 7, which bears against the rear edge of the bar F' and when the latter is in its normal right hand position fits in a rounded notch therein. When the bar is slid to the left in the manner described, by the pressing in of a key, the roller K and rod B' are forced rearward, thereby drawing the rod A' rearward and rocking the pawl-carrier V in that direction. This will disengage the pawl-tooth Z from the notched key plate E and carry the tooth Y into engagement with the notched plate G. The segmental key frame is thus released, and as it is pulled forward and downward the teeth on the plate G slip over the pawl tooth Y. If the key frame be released at any point the engagement of the tooth Y with a notch in said plate will prevent any backward movement of it. When the key frame has been moved to the proper point the contact of the operated key with the stop-arm M will move the detent plate I and release the operated key in the manner before explained, and the consequent return of the detent plate to normal position will permit the spring I' to restore the bar F' to its normal right hand position, bringing the notch in its rear edge opposite the roller K' on the rod B' and permitting the spring C' to pull said rod forward to its normal position. This forward movement of the rod B' will cause the rod A' to rock the pawl-carrier V forward and carry the pawl-tooth Z into engagement with one of the notches in the plate E, and disengage the tooth Y from the plate G. The key frame thus becomes locked from further forward movement, but is free to return to initial position, which it does as soon as released from the hand of the operator, the teeth of the plate E slipping over the pawl-tooth Z during such movement. It will thus be seen that when the segmental key frame is moved forward from normal position it must be given its full proper movement, determined by the position of the particular key operated, and that when given such movement it is arrested and positively locked from further forward movement and can only be returned to normal position, and that it must be returned to such position before the frame can be pulled forward again. In this manner at each operation of the machine a movement of the frame exactly corresponding to the value of the operated key is insured.

Having now described the reciprocating key frame and its associated devices, and explained their mode of operation, I will next describe the indicating and registering mechanisms actuated by such frame.

The lower rear half of the segmental key frame has secured upon it a curved rack L' which meshes with a gear M' upon a shaft N'. The gear M' is a ring which surrounds and has its bearing upon a ratchet O' fast upon the shaft N', Figs. 17 and 18. Secured within a groove upon the inner periphery of the gear ring is a spring P' carrying at its free end a pawl Q' engaging the teeth of the ratchet. The gear ring is thus free to turn independently of the ratchet and shaft in one direction but will carry them with it in the other. The primary wheel of the train of registering wheels hereinafter described turns with the shaft N', and the size of the gear M' and adjustment of the parts is such that when any key is set and the key-frame pulled forward to its limit of movement the rack L', through the medium of the gear-ring, pawl and ratchet and shaft, will turn the registering wheel just far enough to add upon it the value of such key. The gear M' is held in place upon the ratchet O' by means of a disk R' and second ratchet S' fastened to the opposite sides of the ratchet O'. A holding pawl T', Figs. 5 and 11, engaging the ratchet S' prevents backward movement of the shaft and registering wheel. Mounted upon the shaft N' at the right of the gear-ring M', Figs. 5, 9 and 11, is one member U' of a clutch. It is so connected with the shaft, in this instance by pins V' entering holes in the ratchets S' and O', as to turn with it and be capable of slight lateral movement upon it. A spring W' confined between it and the ratchet S' yieldingly holds it in its normal right-hand position. The second member X' of the clutch is splined upon a sleeve Y', Fig. 12, loose upon the shaft N' and having fast upon it the indicator wheel Z'. A spring $A^2$ coiled around the sleeve Y' and fastened at its inner end to said sleeve and at its outer end to the framework, Fig. 13, serves to yieldingly hold the indicator in and return it to normal position. The clutch-member X' consists of a flanged disk having an extended hub or sleeve $B^2$ and provided upon its face within its flange with a series of clutch-teeth corresponding to those upon the member U', Figs. 10 and 12. Fast upon the sleeve $B^2$ is a ratchet $C^2$, and between this ratchet and the clutch-disk X' fits the vertical pin of the shifter $D^2$ which consists of a lever pivoted to the framework at $E^2$, Fig. 11, and having its front end bent around to the left into position to be engaged by the upper right hand corner of the oscillating key-frame when the latter is in normal position. The engagement of the key-frame with this shifting lever normally holds the rear end of the latter thrown to the right and the two clutch-members out of engagement with each other. As soon, however, as the key-frame is pulled forward from its normal position a spring $F^2$ bearing against the bent front end of the lever $D^2$, Figs. 8 and 10, forces said end forward and throws its rear end to the left and engages the clutch, so that during the forward movement of the key-frame the shaft N' will turn the indicator with it. The vertical rod B' by which the pawl-carrier V is operated, in the manner heretofore described, has fastened to it an arm $G^2$, Fig. 2, having a hooked upper end, which, when the arm is pulled forward by the spring C' at the end of the forward and downward stroke of the key-frame, engages the ratchet $C^2$ and holds the indicator Z' from backward movement during the return of the key-frame to normal position and causes the clutch-member U' to slip backward over the member X'. The indicator is thus held in the position to which it has been moved, until a key is pressed in preparatory to another operation, whereupon the rod B' will be forced rearward by the sliding of the bar F' to the right, as before explained, and will carry the arm $G^2$ with it, disengaging its hooked upper end from the ratchet $C^2$ and releasing the indicator, which is thereupon returned to normal position by the spring $A^2$. It will thus be seen that at each operation of the machine the pressing in of the key releases the indicator and permits its spring to restore it to initial position; that during the forward and downward movement of the key-frame the indicator is turned with the shaft and registering wheel; and that at the end of such movement the indicator becomes locked from return movement and remains at the new indication while the key-frame is restored to normal position.

Figure 10:
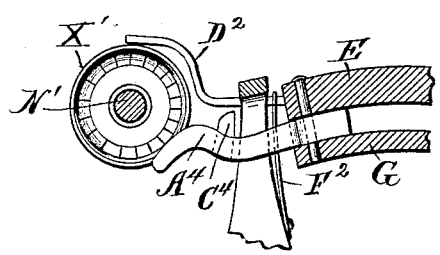
Figure 11:
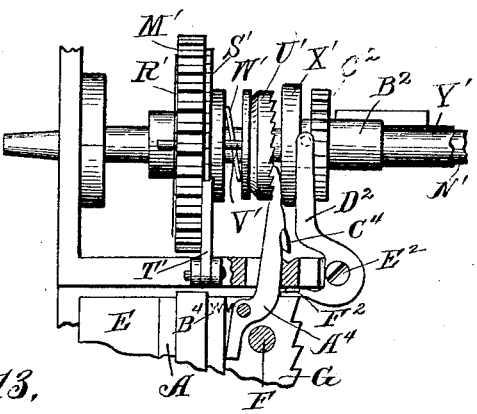

For the purpose of preventing forward movement of the key-frame until the clutch-members U' X' have been engaged, to couple the indicator to the shaft, and to thereby insure the movement of the indicator with the key-frame to the proper extent, there is provided a latch-arm $A^4$, Figs. 10 and 11, pivoted in the key-frame at the upper right hand corner, between the plates E and G, and projecting rearwardly therefrom. A coiled spring $B^4$ confined between the arm and the middle frame A presses the rear end of the arm to the right against the flange of the clutch-member X' but below the plane of the periphery of the clutch-member U'. When the latter is in its normal right-hand position a lug or tooth $C^4$ upon the right hand edge of the latch-arm stands behind the side-wall of the opening in the frame-plate through which it passes, so that until the arm is moved to the left the key-frame is locked from forward movement. There is slight play between the tooth $C^4$ and the part of the framework which it engages, so that the key-frame can be moved far enough to release the front end of the shifting lever $D^2$ and permit its spring $F^2$ to throw its rear end and the clutch-member X' to the left, thereby engaging the two clutch-members and carrying the tooth $C^4$ out of line with its contact-point on the frame, so that the key-frame is released and can be pulled forward as far as desired.

The numbers upon the indicating wheel Z' are adapted to be exposed singly at an opening in a curved plate $H^2$, secured in front of it. For the purpose of hiding the numbers upon the wheel while it is being returned to zero or initial position and while it is being moved to the new indication there is provided an automatic screen-plate $I^2$ adapted to cover and uncover the sight opening in the plate $H^2$. This screen-plate is shown only in Fig. 7, but its position in relation to the other views will be readily understood. It is carried by the upper and forward end of a bent rod or lever $J^2$ pivoted near its middle to the framework at $K^2$ and having secured upon its lower rear end a weight $L^2$ which tends to tilt the front end of the lever and the screen-plate upward and uncover the opening in the plate $H^2$. A lever $M^2$ pivoted to the framework at $N^2$ carries at its upper end a forwardly extending plate $O^2$ provided with a slot through which extends the rod $J^2$ below its pivotal point. A spring $P^2$ interposed between the lower end of the lever $M^2$ and the rear plate of the framework tends to throw the upper end of the lever $M^2$ rearward and tilt the upper end of the rod $J^2$ forward and downward and cause the plate $I^2$ to cover the sight opening, but when the segmental key-frame is in normal position a pin $Q^2$ upon its rear side engages the lower end of the lever $M^2$ and holds it in the position shown, permitting the screen-plate to be tilted upward by the gravity of the weight upon the lower end of the rod $J^2$, to expose the indicator. As soon as the key-frame is pulled forward from normal position and the pin $Q^2$ carried away from the lever M² the spring P² will throw the lower end of the lever forward until the rear side of the lever above its pivot strikes the rear plate of the framework, and cause the plate O² to pull the lower end of the rod J² rearward and tilt the screen-plate downward to cover the sight opening, and the screen-plate will remain in this position until the key-frame is restored to normal position again and the pin Q² re-engaged with the lever M².

For the purpose of preventing the indicator wheel being thrown too far by a quick or violent operation of the machine there is provided a brake which is automatically applied to the wheel at the completion of the forward stroke of the key-frame. This brake consists of a friction shoe R² fastened to a plate S² which is secured upon the right hand end of the shaft N² before referred to, said shaft being a rock-shaft. This shaft has a similar plate T² fast upon its left hand end, and these plates are adapted to be engaged and lifted by the rear ends of arms U² which are rigidly secured at their front ends upon the rock-shafts N in which are pivoted the stop-arms M, Figs. 6 and 7. When the front end of either of the arms M is depressed by the contact of the operated key at the end of the forward movement of the key-frame, and its shaft N thereby rocked, the rear end of the arm U² carried by said shaft will be lifted and the shaft N² be thereby rocked and the brake-shoe R² forced against the periphery of the indicator-wheel to arrest the same.

Figure 12:
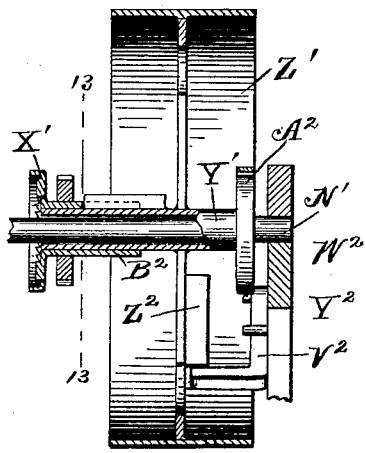
Figure 13:
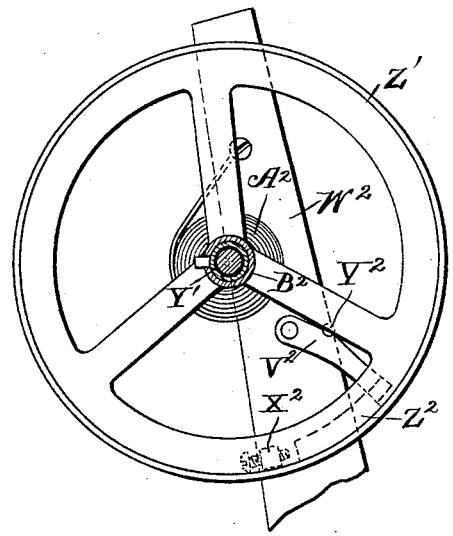

For the purpose of limiting the movement of the indicator wheel in opposite directions there is provided a swinging stop-arm V², Figs. 2, 12 and 13, hung to the bracket W² of the framework, which supports the right hand end of the shaft N'. This arm is free to swing between two fixed stops X² Y² upon the inner face of the bracket W², and its lower end is bent to the left into the path of a lug Z² upon the inner face of the indicator wheel, Fig. 12. When the wheel is reset to initial position by its spring A² the lug Z² engages the forward side of the arm V² and carries it against the fixed stop X², Fig. 2, and when the wheel is given its extreme limit of movement in the opposite direction the lug engages the rear side of the arm and carries it upward and forward against the stop Y², Figs. 12 and 13.

Having now described the indicating mechanism I will next proceed to describe the registering mechanism, reference being had more particularly to Figs. 1, 3, 4, 5 and 17 to 21.

Figure 17:
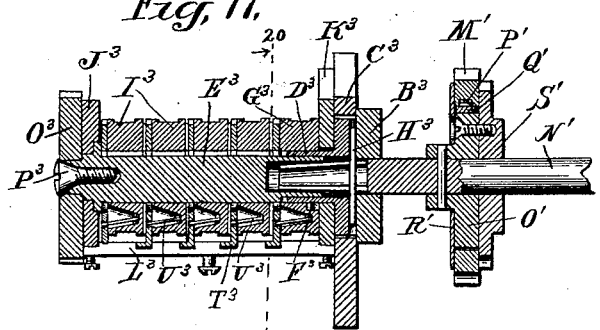
Figure 18:
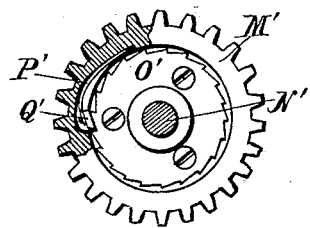
Figure 19:
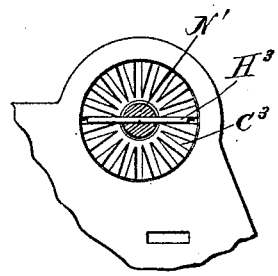
Figure 20:
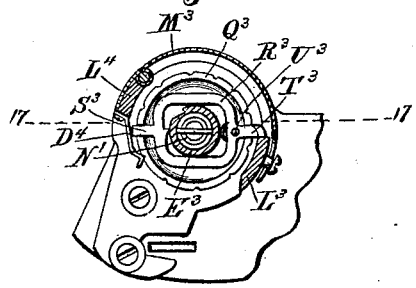
Figure 21:
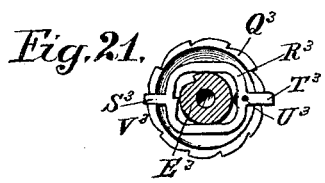

The left hand end of the shaft N' is journaled in a bearing B³ secured to the right side of the left hand frame plate of the machine. The frame plate is provided with a circular opening concentric with the shaft, Fig. 19, through which the shaft extends and in which fits a disk C³ provided on its right side with a series of radial grooves and on its left hand side with a laterally extending hub or sleeve D³. The end of the shaft N' is hollow and inserted in the tubular end of a shaft E³ upon which the registering wheels are loosely mounted. The end of the sleeve D³ fits over the end of the shaft E³ and a lug F³ upon the sleeve fits in a recess in the bore of the primary registering wheel G³ which latter is normally mounted upon the shaft E³. The result of this is that the primary registering wheel turns with the disk C³ and the latter is made to turn with the shaft N' by means of a feather H³ passed through a slot in the shaft and fitting in two of the diametrically opposite grooves in the disk C³, Fig. 19. The series of registering wheels G³ and I³ upon the shaft E³ are inclosed in a casing consisting of two end plates J³ K³ and intermediate cross-bars or plates L³ and L⁴, and a hinged lid M³, Fig. 1, provided with a series of openings through which the numbers upon the respective wheels may be singly exposed. The end plate K³ is secured to the side plate of the framework, Fig. 3, and the opposite end plate J³ is supported by an arm N³ secured at its lower end to the framework, Figs. 1, 3, 4 and 5. The shouldered outer end of the shaft E³ fits in a bearing in the end plate J³, Fig. 17, and its projecting outer end is squared and has fitted upon it a disk O³ having a notched periphery and held in place by a screw P³. The primary registering wheel G³, as before explained, turns with the shaft, and in this instance is provided with a cipher and a series of nineteen numbers, from 5 to 95 inclusive, corresponding to those upon the indicator-wheel and the series of keys F, and the adjustment of the parts is such that when the key-frame is pulled forward until arrested by the key which has been set the primary registering wheel will be turned just far enough to add the value of such key upon it. Each of the remaining wheels I⁴ bears a series of numbers representing the nine digits and a cipher, and the transfers from the primary wheel G³ to the first wheel I³, and from one wheel I³ to another, are effected in the following manner and by the following means, reference being had particularly to Figs. 17, 20 and 21: Each wheel has upon its left side a laterally projecting flange, Q³, Figs. 20 and 21. Within the recess formed by this flange fits a diametrically sliding plate or frame R³ having a rectangular middle or body portion embracing the shaft E³ and two diametrically opposite arms S³ T³ projecting through guide-slots in the flange Q³. Secured in the bottom of a conical recess in the body of the wheel, Fig. 17, is a wire spring U³ whose outer end extends through a hole in the frame R³, Figs. 20 and 21, and presses the frame in one direction, to the right in Figs. 20 and 21. The outer end of the arm T³ of the frame R³ of each wheel excepting the left hand one of the series is bent to the left and overlaps the notched flange upon the right side of the adjacent wheel on the left, Figs. 17 and 20. If the arm T³ be slid inward until engaged with a notch of such adjacent wheel and the wheel carrying the moved arm be turned it will be seen that the adjacent wheel will be turned with it. The end of the arm $T^3$ of each wheel must ride under the bar $L^3$ of the frame or casing at each revolution of such wheel, and as it rides under said bar it will be forced inward and its bent end engaged with a notch in the next higher wheel and carry the latter with it until the arm clears the bar, whereupon the spring $U^3$ will throw it outward again and disengage its bent end from the adjacent wheel. In this manner at each complete revolution of any wheel in the series the next higher wheel will be advanced one number to register the transfer. The sliding plates $R^3$ are also made the means for resetting the registering wheels to zero. The shaft $E^3$ is provided with a longitudinal groove with which a pointed projection $V^3$ upon each plate $R^3$ is adapted to engage when the two are brought opposite each other, the springs $U^3$ causing the projections to enter the groove. The shape of the groove and projections is such that the wheels are free to be turned upon the shaft in their registering movements, the projections $V^3$ slipping over the groove in the shaft, but if the latter be turned in the same direction it will pick up the different wheels as its groove comes opposite their respective projections $V^3$ and carry them with it. By giving the shaft one complete revolution the wheels may all be reset to zero in this manner. The shaft may be turned by means of the notched disk $O^3$ upon its left hand end. In addition to the shallow grasping notches in the periphery of this disk there is a deep locking notch $W^3$, Fig. 3, in which fits a locking projection $X^3$ upon the edge of the lid $M^3$. When it is desired to reset the wheels to zero it is only necessary to lift the lid until the disk $O^3$ has been turned far enough to carry the notch $W^3$ from under the projection $X^3$ and then continue to turn the disk until the notch comes under the projection and the latter drops into it. The bar $L^3$ of the register casing has projecting from its front side a staple $Y^3$ which is embraced by a slot in the lid $M^3$ when the latter is closed, and which is adapted to receive the hasp of a padlock $Z^3$ to lock it in place, Figs. 1, 3 and 5. Spring holding pawls $D^4$ secured to the lower edge of the cross bar $L^4$ and engaging notches in the registering wheels, Figs. 4 and 20, prevent backward movement of them.

The machine is provided with an alarm gong $E^4$ which is sounded at each operation by a striker $F^4$, Figs. 3, 4 and 6. The striker $F^4$ is carried by a pendent rod or wire $G^4$ rigidly secured at its upper end to the rear end of a short lever $H^4$ pivoted to a fixed block $I^4$ of the framework at $J^4$, Fig. 3, and having pivoted in its front end a trip $J^5$ projecting into the path of a pin $K^4$ upon the rear side of the segmental key-frame A. A spring $M^4$ fastened to the upper side of the block $I^4$ extends at its rear end beneath a laterally projecting pin upon the side of the striker lever $H^4$ and yieldingly holds the latter in normal position. When the key-frame is pulled forward at the end of an operation the pin $K^4$ will engage the front end of the trip $J^5$, which cannot tilt upward upon its pivot, and tilt the lever $H^4$, against the resistance of the spring $M^4$, and throw the striker $F^4$ forward away from the gong. When the pin $K^4$ clears the end of the trip the spring will throw the lever back to normal position and the resiliency of the rod $G^4$ will permit the momentum of the striker to carry it against the gong and sound it. When the key-frame is restored to normal position the pin $K^4$ will tilt the trip $J^5$ downward and pass it, whereupon the latter will resume its normal position under the influence of a suitable spring, not shown.

Having thus fully described my invention, I claim—

1. In a registering or analogous machine, the combination of a reciprocating key-frame, a series of keys or stops mounted therein, a lock controlled by said keys for preventing movement of the frame until a key has been operated or set, a stop co-operating with the keys to arrest the frame at different points and means for compelling full movement of the frame from normal position to contact of the operated key with said stop, substantially as described.

2. The combination of a reciprocating key-frame provided with a ratchet, a series of keys mounted in said frame, a movable stop co-operating with the keys to arrest the frame at different points, and a pawl co-operating with the ratchet to prevent retrograde movement of the frame and arranged to be disengaged therefrom by the contact of the operated key with the movable stop, to release the frame when its full movement has been completed, substantially as described.

3. The combination of a reciprocating key-frame provided with a ratchet, a series of keys mounted in said frame, a movable stop co-operating with the keys to arrest the frame at different points, and a pawl arranged to be thrown into engagement with the ratchet by the contact of the operated key with such movable stop, to compel a return of the frame to initial position before being moved forward again, substantially as described.

4. The combination of a reciprocating key-frame provided with two ratchets having oppositely facing teeth, a series of keys mounted in said frame, a movable stop co-operating with the keys to arrest the frame at different points, and two pawls co-operating with the respective ratchets, one being disengaged from its ratchet and the other engaged with its ratchet by the contact of the operated key with the movable stop, substantially as and for the purpose described.

5. The combination of a reciprocating key-frame, a series of keys mounted therein, a spring-pressed detent-plate reciprocating with the frame and co-operating with the keys to hold the operated ones in set position, and a stop co-operating with the set keys to arrest the frame at different points, substantially as described.

6. The combination of a reciprocating key-frame, a series of keys mounted therein, a detent plate or frame moving with the key-frame and co-operating with the keys to hold them in set position, and a stop co-operating with the operated key to arrest the key-frame and with the detent plate to release such key, whereby the frame is arrested and the key released by contact of the key with the stop, substantially as described.

7. The combination of a segmental key-frame oscillating upon an axis, a series of keys mounted therein, a detent-plate oscillating with the key-frame upon the same axis and movable toward and from the key-frame, said detent-plate co-operating with the operated keys to hold them in set position, and a stop co-operating with the keys to arrest the frame at different points, substantially as described.

8. The combination of a segmental key-frame oscillating upon an axis, a series of keys mounted therein, a detent-plate oscillating with the key-frame and pivoted upon an axis transverse to the axis of said frame so as to be capable of moving toward and from the frame, and a stop co-operating with the keys to arrest the frame at different points, substantially as described.

9. The combination of a reciprocating key-frame provided with a ratchet, a series of keys mounted in said frame, a detent-plate reciprocating with the frame and co-operating with the keys to hold the operated one in set position, a stop co-operating with the operated key to arrest the frame and with the detent-plate to release such key, and a pawl co-operating with the ratchet to prevent retrograde movement off the frame, and with the detent-plate to be engaged with its ratchet by the movement of the plate at the setting of a key and disengaged therefrom by the movement of the plate at the release of a key, substantially as described.

10. The combination of a reciprocating key-frame provided with a ratchet, a series of keys mounted in said frame, a detent-plate reciprocating with the frame and co-operating with the keys to hold the operated one in set position, a stop co-operating with the operated key to arrest the frame and with the detent-plate to release the key, and a pawl co-operating with the ratchet and with the detent-plate and arranged to be disengaged from the ratchet by the movement of the plate at the setting of a key and engaged therewith by the movement of the plate at the release of the key, substantially as described.

11. In an indicating machine, the combination of a reciprocating key-frame, a series of keys mounted therein, a single stop common to and co-operating with the series of keys to arrest the frame at different points, an indicator moving with the frame in one direction, means for temporarily holding it in such moved position after the key-frame has returned to initial position, and releasing means operated by the setting of a key to release the indicator and permit it to return to initial position, substantially as described.

12. In an indicating machine, the combination of a reciprocating key-frame, a series of keys mounted therein, a stop co-operating with the keys to arrest the frame at different points, an indicator wheel, a spring for resetting it after it has been moved, a rack and gear and a clutch between the key-frame and indicator for causing the latter to be turned by the frame in one direction, a ratchet turning with the indicator, a pawl co-operating with the ratchet to hold the indicator in the position to which it is moved by the key-frame, and a trip for the pawl actuated by the setting of a key to release the indicator, substantially as described.

13. In an indicating machine, the combination of a reciprocating key-frame, a series of keys mounted thereon, a stop co-operating with the keys to arrest the frame at different points, a rotary shaft, a gear-wheel thereon meshing with a rack upon the key-frame, a ratchet and pawl connection between the gear and shaft, an indicator wheel mounted on the shaft, a clutch between the wheel and shaft, a shifter for the clutch operating to separate its members when the key-frame is returned to normal position, and a spring operating to engage its members as soon as the key-frame is moved away from such position, a ratchet turning with the indicator, a pawl co-operating with the indicator to temporarily hold it in the positions to which it is moved by the key-frame, a trip for the pawl actuated by the setting of a key, to release the indicator, and a spring for resetting it when so released, substantially as described.

14. In an indicating machine, the combination of a reciprocating key-frame, a series of keys mounted therein, a stop co-operating with the keys to arrest the frame at different points, an indicator actuated by said key-frame, and an automatic screen moving in front of the indicator when the key-frame is displaced from normal position, to hide the indicator, and moved away from such position by the key-frame when the latter is returned to normal position, to expose the indicator, substantially as described.

15. In an indicating machine, the combination of a reciprocating key-frame, a series of keys mounted therein, a movable stop co-operating with the keys to arrest the frame at different points, an indicator operated by said key-frame, and a brake for the indicator actuated by the movable stop and engaged with the indicator by the contact of the operated key with such stop, to arrest the indicator and prevent excess of movement of it under its own momentum, substantially as described.

16. The combination of the series of notched registering wheels I³ each provided with a flange Q³, the spring-pressed sliding plates R³ within the recesses formed by the flanges, each having the diametrically opposite arms S³ T³ fitting in guide notches in the flange Q³ and the arm T³ of each plate being bent to overlap the next higher wheel in the series, and the cross-bar L³ co-operating with the arms T³, substantially as and for the purpose described.

17. The combination of the longitudinally grooved shaft E³, the series of notched registering wheels I³ mounted thereon, each provided with a flange Q³, and the spring-pressed sliding plates R³ within the recesses formed by the flanges Q³, each plate having a projection V³ adapted to engage the groove in the shaft, substantially as and for the purpose described.

18. The combination of the shaft E³, the series of registering wheels mounted thereon, means intermediate each wheel and the shaft for causing the shaft to pick up the wheels and carry them with it when turned in one direction, the disk O³ fast on the end of the shaft, and the casing provided with the hinged lid M³ having the lateral projection X³ co-operating with the notch W³ in the disk O³, substantially as described.

19. In a cash register, the combination of a reciprocating key-frame, a series of keys carried by and movable in said frame, a stop co-operating with the keys to arrest the frame at different points determined by the operated keys, a rack moving with said frame, a pinion meshing with the rack, an indicator turned by the pinion, a register, and means intermediate the pinion and register for causing the pinion to turn the register in one direction but not in the other, substantially as described.

20. In a cash register and indicator, the combination of a reciprocating key-frame, a series of keys carried by and movable in said frame, a stop co-operating with the keys to arrest the frame at different points determined by the operated keys, a rack moving with said frame, a pinion meshing with the rack, an oscillatory indicator on one side of the pinion and actuated thereby, a register on the opposite side of the pinion, and means intermediate the pinion and register for causing the pinion to turn the register in one direction but not in the other, substantially as described.

21. In a cash register and indicator, the combination of a reciprocating key-frame, a series of keys carried by and movable in said frame, a stop co-operating with the keys to arrest the frame at different points determined by the operated keys, a rack moving with said frame, a shaft, a pinion loose thereon, an oscillatory indicator also loose upon the shaft and actuated by the pinion, a register mounted upon the same shaft, and means intermediate the pinion and register for causing the pinion to turn the register with it in one direction and not in the other, substantially as described.

22. In a cash register and indicator, the combination of a reciprocating key-frame, a series of keys carried by and movable in said frame, a stop co-operating with the keys to arrest the frame at different points determined by the operated keys, a rack moving with said frame, a pinion meshing with the rack, an oscillatory indicator turned by the pinion, a vibrating screen plate moved in one direction by a spring and in the other by the key-frame, to alternately hide and expose the indicator, a register, and means intermediate the pinion and register for causing the pinion to turn the register with it in one direction and not in the other, substantially as described.

23. In a cash register and indicator, the combination of a reciprocating key-frame, a series of keys carried by and movable in said frame, a stop co-operating with the keys to arrest the frame at different points determined by the operated keys, a rack moving with said frame, a pinion meshing with the rack, an oscillatory indicator turned by the pinion, a vibrating screen plate moved in one direction by a spring, to hide the indicator, and in the other by the key-frame, to expose it, a register, and means intermediate the pinion and register for causing the pinion to turn the register with it in one direction and not in the other, substantially as described.

24. In a cash register and indicator, the combination of a reciprocating key-frame, a series of keys carried by and movable in said frame, a stop co-operating with the keys to arrest the frame at different points determined by the operated keys, a rack moving with the frame, a pinion meshing with the rack, a register and indicator actuated by the pinion, and an automatic screen plate for the indicator operated by the key-frame, substantially as described.

25. In a cash register and indicator, the combination of a reciprocating key-frame, a series of keys carried by and movable in said frame, a stop co-operating with the keys to arrest the frame at different points determined by the operated keys, a rack moving with the frame, a pinion meshing with the rack, a register and indicator actuated by the pinion, an automatic screen plate for the indicator and an alarm mechanism, both operated by the reciprocating frame, substantially as described.

LEO EHRLICH.

Witnesses:
W. PALMER CLARKSON,
AMALEO TOLSMAN.